United States Patent [19]

Zank et al.

[11] Patent Number: 5,256,753
[45] Date of Patent: Oct. 26, 1993

[54] BORAZINE DERIVATIZED POLYCARBOSILANE POLYMERS AND THE CERAMICS DERIVED THEREFROM

[76] Inventors: Gregg A. Zank, 500 Sylvan La., Midland, Mich. 48640; Larry G. Sneddon, 813 Briarwood Rd., Newtown Square, Pa. 19073; Kai Su, 4315 Larchwood Ave., Third Floor, Philadelphia, Pa. 19104

[21] Appl. No.: 970,517

[22] Filed: Nov. 2, 1992

[51] Int. Cl.$^5$ ............................................. C08G 79/08
[52] U.S. Cl. ........................................ 528/7; 501/92; 525/474
[58] Field of Search ............... 328/7; 525/474; 501/92

[56] References Cited

U.S. PATENT DOCUMENTS

| | | |
|---|---|---|
| 4,220,600 | 9/1980 | Yajima et al. |
| 4,342,712 | 8/1982 | Yajima et al. |
| 4,515,742 | 5/1985 | Yajima et al. |
| 4,550,151 | 10/1985 | Takamizawa et al. ........... 528/7 |
| 4,604,367 | 8/1986 | Takamizawa et al. |

OTHER PUBLICATIONS

D. Seyferth et al., Silicon Ceramics with a Dash of Boron, Dept. of Chem., Massachusetts Institute of Technology, 15-27.

S. Yajima et al., Synthesis of Continuous Silicon Carbide Fibre with High Tensile Strength and High Young's Modulus, J. of Materials Science 13 (1978), 2569-2576.

*Primary Examiner*—Melvyn I. Marquis
*Attorney, Agent, or Firm*—Roger E. Gobrogge

[57] ABSTRACT

The present invention relates to a method of preparing borazine modified polycarbosilane polymers. The method comprises reacting a polycarbosilane polymer with a material comprising at least borazine ring for a time sufficient to produce the desired polymer. This invention also relates to the novel polymers produced by the above method and the ceramic products derived from heating the novel polymers to greater than about 800° C.

20 Claims, No Drawings

BORAZINE DERIVATIZED POLYCARBOSILANE POLYMERS AND THE CERAMICS DERIVED THEREFROM

BACKGROUND OF THE INVENTION

The present invention relates to a method of preparing borazine modified polycarbosilane polymers. The method comprises reacting a polycarbosilane polymer with a material comprising at least one borazine ring for a time sufficient to produce the desired polymer. This invention also relates to the novel polymers produced by the above method and the ceramics derived from pyrolysis of the novel polymers to greater than about 800° C.

A variety of polycarbosilane oligomers, cyclics, resins and linear polymers are known in the art. Generally, such polymers are characterized as having backbones with alternating silicon and carbon atoms. Polycarbosilanes are useful as precursors to silicon carbide-related ceramics. Metallic compounds have been incorporated into prior art polycarbosilanes to enhance the stability of the polymers and the resulting ceramic fibers. For example, Yajima et al. taught that improved thermal stability of polycarbosilane fibers can be achieved by incorporation of compounds including a titanoalkoxide (U.S. Pat. No. 4,342,712, issued Aug. 3, 1982) and zirconoalkoxide (U.S. Pat. No. 4,515,742, issued May 7, 1985). Similarly, Yajima et al., in U.S. Pat. No. 4,220,660, issued Sep. 2, 1980, described a process for producing polycarbosilanes partly containing siloxane bonds wherein polyborosiloxane containing phenyl groups in at least a part of the side chains of Si is reacted with a polysilane. However, Yajima et al. noted that most of the boron is dissociated and is released out of the reaction system. Moreover, while Yajima et al. formed polycarbosilane products containing a small amount of boron which had improved physical properties, they did not teach a simple derivatization of preformed polycarbosilane as described in the present invention.

Takamizawa et al., in U.S. Pat. No. 4,604,367, issued Aug. 5, 1986, described a process wherein an organoborosilicon polymer comprising the elements of silicon, carbon, boron and nitrogen is prepared from the reaction a borazine with a polydimethylsilane. However, Takamizawa et al. failed to teach that a borazine modified polycarbosilane could be made from a preformed polycarbosilane.

Seyferth et al., in "Silicon Ceramics with a Dash of Boron" (Front. Organosilicon Chem., Proc. Int. Symp. Organosilicon Chem., 9th, Meeting Date 1990, 15-27), described the preparation of $[B_{10}H_{10}\cdot diamine]_x$ polymers achieved by reacting decaborane and dimethylbis(dimethylamino)-silane. While Seyferth taught that the simple chemistry described therein also can be applied to modifying mixed systems of silanes and siloxanes, the present article failed to include preformed polycarbosilanes.

The present invention describes a method of forming a borazine modified polycarbosilane by reacting a borazine with a polycarbosilane. The present invention also describes novel borazine modified polycarbosilane polymers and the ceramics derived from the pyrolysis of these polymers.

SUMMARY OF THE INVENTION

The present invention is a method of forming borazine modified polycarbosilane polymers. The method comprises reacting a material comprising at least one borazine ring having a hydrogen atom attached to at least one nitrogen or boron thereof, with a polycarbosilane polymer having a backbone of alternating silicon and carbon and comprising at least one unit of the structure:

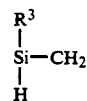

for a time sufficient to form the borazine modified product polymers at a temperature of below about 300° C., wherein $R^3$ is independently selected from the group consisting of methyl radicals and silicon substituted alkyl radicals.

The present invention also relates to the novel polymers produced by this process and the ceramics derived from pyrolysis of these polymers.

DETAILED DESCRIPTION OF THE INVENTION

The present invention is based on the discovery that borazine can be used to modify the polycarbosilane polymers claimed herein to form their borazine modified derivatives. The proposed method whereby this reaction occurs can be described as follows:

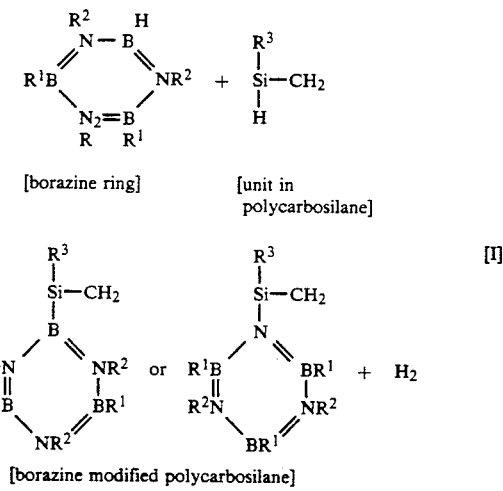

[borazine modified polycarbosilane]

The modification of a polycarbosilane polymer by a borazine was unexpected since it was not known whether the branched polymers of the starting materials could be caused to react in the above manner (due to issues such as steric hindrance) without destroying their structure.

Polycarbosilanes are commercially available and methods of making polycarbosilanes are well known in the art. The polycarbosilanes useful herein have a backbone of alternating silicon and carbon. They may contain one or more cyclic structures and may be linear or branched. The polycarbosilanes comprise at least one unit of the structure:

wherein each $R^3$ is independently selected from the group consisting of methyl radicals and silicon substituted alkyl radicals. The Si—H bond is the proposed reactive site of the polycarbosilane in reaction mechanism [I]. Thus, a preferred polycarbosilane reactant contains at least one Si—H bond.

The most preferred polycarbosilanes are formed from the decomposition of organopolysilanes such as, for example, polymethylsilanes, followed by polymerization of the resultant carbosilanes. Yajima et al., in "Synthesis of continuous silicon carbide fibre with high tensil strength and high Young's modulus," J. Mat. Sci., vol. 13, pp. 2569-2579 (1978) which is incorporated herein by reference, taught that the synthesis of polycarbosilane takes place at a temperature between 350° and 500° C. Preferred is a reaction temperature equal to or above 400° C. The higher molecular weight polycarbosilane products formed by the Yajima et al. process comprise cyclic and "ladder-bonded" arrangements as described by structure [II]:

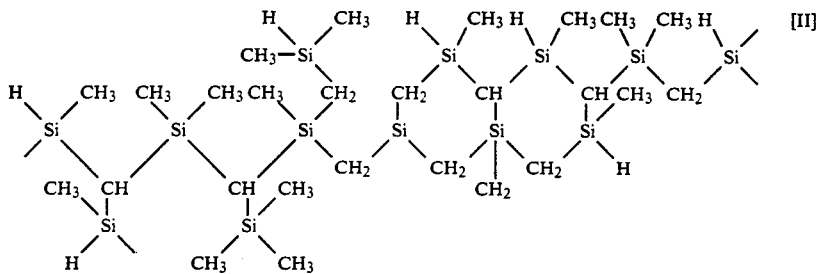

The Yajima et al. process also produces lower molecular weight polycarbosilanes which can be isolated from the product mixture by vacuum distillation. The lower molecular weight polycarbosilane products comprise ring arrangements as represented by structure [III]:

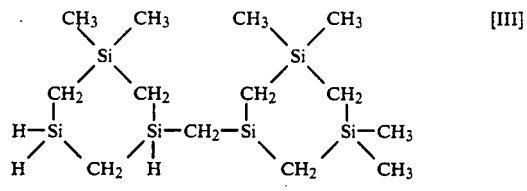

Polycarbosilanes formed by the Yajima et al. process may also contain a relatively small number of residual Si—Si bonds. These Si—Si bonds can react with borazine to modify the polycarbosilane.

The polycarbosilane polymer is reacted with a material comprising at least one borazine ring to produce the desired borazine modified polycarbosilane polymer. The material useful herein comprises at least one borazine ring having a hydrogen atom attached to at least one nitrogen or boron thereof. Any material known in the art comprising at least one such borazine ring can be used in the present invention.

As shown in proposed reaction mechanisms [I], a preferred embodiment of the invention comprises reacting the polycarbosilane with a material comprising at least one borazine ring of the general formula $(BR^1—NR^2)_3$ wherein at least one $R^1$ or $R^2$ is a hydrogen radical. The remaining $R^1$ and $R^2$ in said borazine ring are independently selected from the group consisting of hydrogen radicals, hydrocarbon radicals containing 1 to 20 carbon atoms, borazine substituted hydrocarbon radicals and radicals containing boron and nitrogen. The hydrocarbon radicals can be linear or cyclic groups. Thus, $R^1$ and $R^2$ can be, for example, alkyl radicals such as methyl, ethyl, propyl, isopropyl, hexyl, or octadecyl; alkenyl radicals such as vinyl, allyl or hexenyl; cycloaliphatic radicals such as cyclopentyl, cyclohexyl or cyclohexenyl; aromatic hydrocarbon radicals such as phenyl or tolyl. $R^1$ and $R^2$ can also be any polyvalent hydrocarbon radical such as methylene, dimethylene, trimethylene, or octadecamethylene.

Thus, materials comprising borazine ring useful herein can be monomers such as, for example, $(BH—NH)_3$, mono-B-methyl borazine, di-B-methyl borazine, mono-N-ethyl borazine, di-N-methyl borazine, tri-N-propyl borazine, mono-N-di-B-methyl borazine, mono-B-vinyl borazine or mono-N-phenyl-di-N-methyl borazine and borazanaphthalene. Materials comprising borazine ring useful herein can also be polymers such as, for example, polyborazylene, polyvinyl borazine and organic copolymers of polyvinyl borazine.

As shown in proposed reaction mechanism [I], the proposed reactive sites in the reaction are the B—H and N—H bonds. The reactivity of the materials comprising borazine ring increases with the increased number of B—H and N—H bonds. Therefore, the most preferred material comprising borazine ring is $(BH—NH)_3$.

The minimum amount of the material comprising borazine ring used in the present invention is generally the desired amount of borazine incorporated in the polycarbosilane. An excess borazine may be used to prevent crosslinking reaction of the polymers. The amount of excess borazine used is only limited by the cost effectiveness of the process. Preferred is an amount of the material comprising borazine ring which dissolves the polycarbosilane reactant to form a homogenous solution.

The reaction of the polycarbosilane and material comprising borazine ring is generally conducted by merely mixing the reactants in a suitable reaction vessel. This reaction can also be conducted in the presence of a solvent. The solvents which may be used herein include any which acts as a solvent for the material comprising borazine ring, the polycarbosilane polymer and the borazine modified polycarbosilane polymer without adversely affecting any of the species. The solvents may be, for example, solvents not containing active N—H bonds such as ethers, alkanes, or aromatic hydrocarbons. Most preferred is a reaction conducted without solvents.

The above reactants are generally brought together in a essentially anhydrous atmosphere. What is meant by essentially anhydrous is that the reaction is preferably carried out in a absolutely anhydrous atmosphere but minute amounts of moisture can be tolerated.

The reaction of the polycarbosilane polymer can be conducted in the presence of a catalyst. The catalyst which can be employed in the present reaction is any catalyst used in the art to facilitate the dehydrogenation reaction between the borazine ring and the polycarbosilane polymer. The dehydrogenation catalyst can be, for example, platinum dibromide. The dehydrogenation catalyst can also be, for example, osmium (II), rhodium (II) or ruthenium (II) metals, each containing ligands comprising phosphines and/or carbonyls.

The reaction of the polycarbosilane polymer is generally conducted in a reaction environment wherefrom the hydrogen byproduct is periodically removed. For example, the reaction can be conducted in a static vacuum reaction environment with a hydrogen headspace wherefrom the hydrogen byproduct is periodically removed from the reaction vessel.

In addition, the reaction can be conducted under reflux in an inert atmosphere wherefrom the hydrogen gas is periodically purged from the system with a inert gas. By inert atmosphere it is meant that the reaction is carried out under a blanket of inert gas such as argon, nitrogen or helium.

Removal of hydrogen byproduct drives the derivatization reaction forward. Thus, the frequency of hydrogen byproduct removal affects the equilibrium of derivatization reaction.

Alternatively, the reaction can be conducted in a pressure vessel as shown in Examples 1 and 2 below. Since the increase in pressure (e.g., up to 5 atm) drives the reaction forward, removal of the hydrogen byproduct may not be necessary.

The reactants can be reacted at any temperature below the boiling point of the material comprising the borazine ring, unless elevated pressures are employed. Under atmospheric pressure, the reactants can be reacted at room temperature, but preferred is a slightly elevated temperature to induce the reaction. More preferred is reaction temperature below about 300 degrees Celsius. Even more preferred is a reaction temperature below about 100 degrees Celsius. The most preferred reaction temperature is between 60 and 80 degrees Celsius. The length of time that the reaction requires depends on the temperature employed and the polymer viscosity one wishes to achieve. Under increased pressure, the reaction can run to completion in less time. The amount of borazine incorporated into the polycarbosilane polymer can also be readily controlled by the reaction time, temperature and pressure.

After the reaction is completed, the unreacted material comprising the borazine ring can be removed from the reaction vessel by means of liquid removal methods well known in the art. The removal can be performed by, for example, vacuum evaporation or distillation. The unreacted material comprising the borazine ring can then be recycled.

The borazine modified polycarbosilane polymer produced by the above reaction is then merely recovered from solution. Methods such as recrystallization or simple evaporation of the solvent under heat and/or vacuum are known in the art and useful herein.

The process of this invention may produce polymers having molecular weights higher than, equivalent to or less than those of the starting polycarbosilane polymers. Modification of the polymers has been confirmed by $^{11}$B NMR data which show a fairly clean derivatization, and by IR data which show the presence of B—H, B—N, and N—H stretches that were not present in the polycarbosilane starting material.

Pyrolysis of the modified polymers to greater than about 800° C. yieldss ceramic products with desirable properties. The resultant polymers formed by the above process undergo retarded crystallization even after pyrolysis to 1800° C. In addition, the derivatized polymers of this invention have somewhat higher ceramic yields than the polycarbosilane starting material. Moreover, the inventors were surprised to find that nitrogen remained in the ceramics even after pyrolysis to 1800° C.

The derivatized polymers of this invention are especially valuable since they are soluble and easily curable at elevated temperatures. Such curability is critical in applications such as ceramic fibers, coatings on ceramic-ceramic and carbon-carbon composites, ceramic monoliths and ceramic matrix composites.

The following non-limiting examples are provided so that one skilled in the art may more readily understand the invention.

In the following examples, polycarbosilane samples of the general formula $Si_{1.00}C_{1.96}H_{4.87}$ were obtained from Dow Corning Corp. (Midland, Mich.). Borazine of the formula $(BH—NH)_3$, purchased from Callery Chemical Co., was purified by refraction through $-45°$, $-78°$ and $--196°$ trap series, with only the material collected at $-78°$ used. Benzene was freshly distilled from sodium benzophenone.

Elemental analyses of carbon, hydrogen and nitrogen for both the polymers and the ceramics were performed on a Control Equipment Corporation 240-XA Elemental Analyzer. Oxygen analyses were done on a Leco Oxygen Analyzer equipped with an Oxygen Determinator 316 (Model 783700) and an Electrode Furnace EF100. Silicon and boron compositions were determined by a fusion technique which consisted of converting the material to soluble forms of silicon and boron followed by analyzing the solute for total silicon or boron by atomic absorption spectrometry.

X-ray diffraction (XRD) characterization was performed on a Norelco Philips vertical goniometer (Type 42271/0) fitted with a closed sample chamber, sample spinner, graphite monochromator, scintillation counter, and a long fine focus copper target tube. All synthetic manipulations were carried out by using standard high vacuum or inert-atmosphere techniques.

EXAMPLE 1 and 2

A sample of polycarbosilane was charged into a 88 mL Fisher pressure reaction vessel and the vessel was evacuated. The purified borazine was vacuum distilled into the reactor vessel, which was sealed and brought to room temperature. The amounts of polycarbosilane (PCS (g)) and borazine (borazine (g)) used for each example are detailed in Table 1. The polycarbosilane gradually dissolved to form a clear solution. The mixture was then heated in an oil bath at 68° C. As shown in Table 1 (time (h)), the reactant mixture which produced borazine modified polymer (1) was heated in excess borazine for 17.2 hours, while the mixture which produced borazine modified polymer (2) was heated for 6.7 hours. The borazine modified polymers were isolated as white solids after vacuum evaporation of excess borazine from the reaction vessel.

Elemental analyses were performed on the precursor polymer (PCS) and the borazine modified polymers (1) and (2). As shown in Table 1, more borazine is incorporated into the polycarbosilane polymer when the reaction is allowed to run for a longer time at constant temperatures.

Gel permeation chromatography (GPC) data (i.e. molecular weight distribution averages) were obtained on a GPC (Waters Inc.) equipped with a model 600E systems controller, model 490 ultraviolet absorbance (UV) and model 410 differential refractometer detectors interfaced to a Digital Professional 380 computer employing EXPERT software (Waters Inc.). All values were relative to polystyrene standards, Diffuse-reflectance IR spectra were obtained on a Perkin-Elmer 7770 Fourier transform spectrophotometer equipped with the appropriate diffuse-reflectance attachment. $^{11}$B NMR spectra at 64.2 MHz were obtained on a Bruker AE-200 spectrometer equipped with the appropriate decoupling accessories. All $^{11}$B shifts were referenced to $BF_3$—$O(C_2H_5)_2$ (0.0 ppm) with a negative sign indicating an upfield shift.

Borazine modified polymers (1) and (2) had elemental compositions consistent with the formulae listed in Table 1 (Polymer Composition). IR spectra for polymers (1) and (2) show absorptions characteristic of the borazinyl BH (2510 cm$^{-1}$) and NH (3450 cm$^{-1}$), polymer SiH at (2099 cm$^{-1}$) and saturated CH (2890-3000 cm$^{-1}$) with the relative intensities of these absorptions changing according to the polymer composition. With increasing borazine content, the backbone SiH and CH absorptions decrease, while the borazine BH and NH absorptions increase. The $^{11}$B decoupled proton NMR spectra of both reactant and product samples show broad resonances centered at 4.81 ppm (NH), 4.52 ppm (BH), and a very strong resonance at 0.27 ppm (saturated C—H attached to Si and SiH) with the relative intensities characteristic of their borazine and polycarbosilane compositions. $^{11}$B NMR spectrum for polymer (1) is composed of a singlet at 25.9 ppm and a doublet at 30.2 ppm ($J_{BH}$=112 Hz) in a 1:2 integrated ratio, indicating the borazine unit is connected to the polycarbosilane through one of the three boron atoms in the borazine ring. The chemical shifts are characteristic of those observed for substituted borazines suggesting no ring-opening reaction has occurred. The $^{11}$B NMR spectra for all modified polymers contained similar features; however, the resonances in the higher borazine content polymer (1) were broadened.

Other characterizations of the polymers are summarized in Table 2.

TABLE 1

| poly-mer | PCS (g) | Borazine (g) | T (°C.) | time (h) | Polymer Composition |
|---|---|---|---|---|---|
| PCS | — | — | — | — | $Si_{1.00}C_{1.96}H_{4.87}$ |
| (1) | 1.34 | 4.00 | 68 | 17.2 | $Si_{1.0}B_{0.47}N_{0.58}C_{1.99}H_{5.63}$ |
| (2) | 2.18 | 5.01 | 68 | 6.7 | $Si_{1.0}B_{0.16}N_{0.22}C_{1.96}H_{5.18}$ |

TABLE 2

Characterization of the Polycarbosilane Precursor and Borazine Modified Products

| polymer | elemental analysis (wt %) | | | | | GPC | |
|---|---|---|---|---|---|---|---|
| | % C | % H | % N | % Si | % B | Mn | Mw |
| PCS | 40.88 | 8.47 | — | 48.7 | — | 598 | 5,560 |
| (1) | 33.24 | 7.83 | 11.32 | 38.9 | 7.06 | 637 | 6,490 |
| (2) | 37.77 | 8.30 | 4.88 | 45.2 | 2.74 | 637 | 5.580 |

EXAMPLES 3-4

Investigation of the ceramic conversions of the modified polymers from Examples 1 and 2 were performed by converting the polymers to ceramic chars. An aliquot of the resin was weighed into a graphite crucible which was then transferred into an Astro graphite furnace equipped with Eurotherm temperature controllers. A type K thermocouple was used to monitor temperatures below 900° C. and an Ircon Modeline Plus optical pyrometer for temperatures above 900° C. The furnace was then evacuated to <20 torr and backfilled with argon. Under a purge of argon, the sample was heated to a temperature of 1800° C. at a rate of 10° C. per minute and held at that temperature for one hour. The sample was then cooled to room temperature. The resulting ceramic chars were ground for elemental analysis and x-ray diffraction (XRD) characterization, employing a mortar and pestle molded of finely powdered synthetic sapphire.

Table 3 summarizes the ceramic yield and compositions for the ceramics derived from the precursor polymer (PCS) and the borazine modified polymers (1) and (2).

TABLE 3

Ceramic Yield, Elemental and XRD Analyses of the Polycarbosilane Precursor and Borazine Modified Product after pyrolysis to 1800° C.

| Example # | poly-mer | yield | ceramic elemental analysis (wt %) | | | | XRD |
|---|---|---|---|---|---|---|---|
| | | | % C | % N | % Si | % B | |
| — | PCS | 56.18% | 36.2 | — | 57.7 | — | most crystallinity 98% beta-SiC 2% graphite |
| 3 | (1) | 69.97% | 32.3 | 8.67 | 56.6 | 5.26 | least crystallinity 96% beta-SiC 4% graphite |
| 4 | (2) | 69.42% | 35.2 | 2.68 | 57.1 | 1.56 | medium crystallinity 97% beta-SiC 3% graphite |

As shown in Table 3 above, higher ceramic yield results when boron is incorporated into the polycarbosilane polymers. In addition, increased boron incorporation in the polycarbosilane resulted in decreased crystallization in the modified polymer.

That which is claimed is:

1. A method of forming a borazine modified polycarbosilane polymer comprising:
   reacting a material comprising at least one borazine ring having a hydrogen atom attached to at least one nitrogen or boron thereof, with a polycarbosilane polymer having at least one unit of the structure:

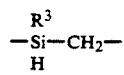

at a temperature of below about 300° C. for a time sufficient to form the borazine modified product polymers, wherein $R^3$ is independently selected from the group consisting of methyl radicals and silicon substituted alkyl radicals.

2. The method of claim 1 wherein the borazine ring has the general formula $(BR^1-NR^2)_3$, wherein at least one $R^1$ or $R^2$ is a hydrogen radical, the remaining $R^1$ and $R^2$ radicals are independently selected from the group consisting of hydrogen radicals, hydrocarbon radicals containing 1 to 20 carbon atoms and radicals containing boron and nitrogen.

3. The method of claim 2 wherein the material comprising borazine ring is selected from the group consisting of $(BH-NH)_3$, borazanaphthalene, polyborazylene and polyvinyl borazine.

4. The method of claim 1 wherein the polycarbosilane polymer is formed by the decomposition reaction of polymethylsilane at a temperature between about 400° and 500° C. followed by the polymerization of the resultant carbosilanes.

5. The method of claim 1 wherein the polycarbosilane polymer comprises cyclic and ladder-bonded arrangements of the structure:

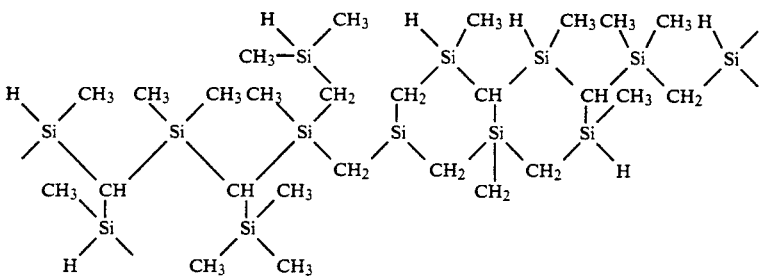

6. The method of claim 1 wherein the polycarbosilane polymer comprises ring arrangements of the structure:

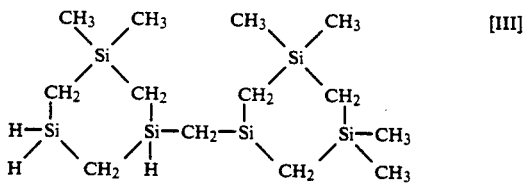

7. The method of claim 1 wherein the reaction temperature is in the range of 60° to 80° C.

8. The method of claim 1 wherein the material comprising borazine ring and polycarbosilane are reacted together in an essentially anhydrous atmosphere.

9. The method of claim 1 wherein the reaction is conducted in a static vacuum system with a hydrogen headspace from which the hydrogen gas is periodically removed.

10. The method of claim 1 wherein the reaction of polycarbosilane polymer is conducted under reflux in an inert atmosphere wherefrom the hydrgen gas is periodically purged with a inert gas.

11. The method of claim 1 wherein the reaction of polycarbosilane polymer is conducted under a pressure above atmospheric pressure.

12. The method of claim 1 wherein the reaction of polycarbosilane polymer is conducted in a solvent selected from the group consisting of alkanes, ethers and aromatic hydrocarbons.

13. The method of claim 1 wherein the reaction of the polycarbosilane polymer is conducted in the presence of a catalyst which facilitates the dehydrogenation reaction between the borazine ring and the polycarbosilane.

14. The borazine modified polycarbosilane polymer produced by the process of claim 1.

15. The products obtained from heating the borazine modified polycarobislane polymer of claim 14 to greater than about 800° C.

16. The borazine modified polycarbosilane polymer produced by the process of claim 2.

17. The borazine modified polycarbosilane polymer produced by the process of claim 3.

18. The borazine modified polycarbosilane polymer produced by the process of claim 4.

19. The borazine modified polycarbosilane polymer produced by the process of claim 5.

20. The borazine modified polycarbosilane polymer produced by the process of claim 6.

* * * * *